United States Patent
Yang et al.

(10) Patent No.: US 8,390,468 B2
(45) Date of Patent: Mar. 5, 2013

(54) AIRCRAFT AND WATERCRAFT EMERGENCY INFORMATION SYSTEM

(76) Inventors: Dongning Yang, Guangdong Province (CN); Jinmao Yang, Guangdong Province (CN)

( * ) Notice: Subject to any disclaimer, the term of this patent is extended or adjusted under 35 U.S.C. 154(b) by 261 days.

(21) Appl. No.: 12/939,155

(22) Filed: Nov. 3, 2010

(65) Prior Publication Data
US 2012/0105245 A1 May 3, 2012

(51) Int. Cl.
*G08B 3/00* (2006.01)
(52) U.S. Cl. ............. 340/691.1; 340/691.3; 340/539.13; 340/573.1; 340/945; 340/984; 340/7.5
(58) Field of Classification Search ............... 340/691.1, 340/691.3, 539.1, 539.13, 539.25, 573.1, 340/945, 953, 984, 985, 7.5; 701/1, 9, 11
See application file for complete search history.

(56) References Cited

U.S. PATENT DOCUMENTS

| | | | |
|---|---|---|---|
| 6,275,164 B1 * | 8/2001 | MacConnell et al. | 340/692 |
| 7,271,713 B2 * | 9/2007 | Ayoub et al. | 340/471 |
| 7,948,401 B2 * | 5/2011 | Wartofsky et al. | 340/945 |
| 2003/0071743 A1 * | 4/2003 | Seah et al. | 340/945 |

* cited by examiner

*Primary Examiner* — Hung T. Nguyen

(57) ABSTRACT

A method for collecting and recording external environment data in emergency situation for aircraft and watercraft is provided. In one embodiment, the method includes several modules which collects and records external environment data. At the same time the data and the emergency signal is also sent to control tower in order to help the rescue team. The emergency information system may also be used to replace the 'black box' if the voyage data transmitted to the "black box" is also transmitted to the emergency information system.

5 Claims, 2 Drawing Sheets

AIRCRAFT AND WATERCRAFT EMERGENCY INFORMATION SYSTEM

BACKGROUND OF THE INVENTION

This invention relates to a search and rescue auxiliary equipment, particularly refers to an Aircraft and Watercraft Emergency Information System (AWEIS) for emergency situations which collects and records the external environment data providing necessary information for the rescue.

Voyage data recorder (VDR)—'Black Box' is a data recording device which is widely used nowadays. Not only in the commercial airplanes, airships, hot air balloons and other aircrafts but also in ships, submarines, other voyage devices and even vehicles, VDR has played an important role. We can recall and analyze the data from VDR to gain information about what happened during the voyage. However, the existing Black Box in aircraft mainly stores internal information, such as the drivers' dialogue, real-time voyage data, and the status of equipments, but it cannot collect external environment data. Thus, the rescue team is not able to obtain any information about the actual situation outside the aircraft. In addition, in an emergency situation, the Black Box cannot tell people where it is located, which makes it impossible to help the rescue team to find the aircraft.

BRIEF SUMMARY OF THE INVENTION

The purpose of this invention is to overcome the shortcomings of the "black box", providing an Aircraft and Watercraft Emergency Information System (AWEIS) which collects real-time data of the external environment of the aircraft keeping communication with the control tower and helping the rescue team to locate the aircraft when disaster happened. With its help, the rescue team can shorten the searching time, lower the searching cost, and increase the survival rate.

The invention is to be achieved by one kind of 'AWEIS' which includes:

A1. Release and Ejection Module—it is installed between airframe and Floatable Module which can be controlled manually, electronically, or automatically by the 'AWEIS'. It launches the Floatable Module when necessary. The Release and Ejection Module includes the space-limiting-unit and ejection-unit. The space-limiting-unit limits the size of Floatable Module before the Floatable Module is launched. The ejection-unit releases the Floatable Module and ejects it outside the aircraft.

A2. Floatable Module—it is the container for Audio-Video Module and Positioning & Signaling Module. It can be ejected when in emergency. After the Floatable Module was ejected, the Audio-Video Module and Positioning & Signaling Module will start to collect and send the data to the rescue team. The Floatable Module includes parachute and sealed film box unit which is pre-charged with high-pressure low-density gas.

A3. Traction Module—it connects the aircraft and the Floatable Module. When the Floatable Module is ejected, the Traction Module keeps the aircraft and Floatable Module connected at a certain distant in order to provide a proper environment for data collecting. Traction Module includes a traction wire unit and a damping control unit. The traction wire unit connects the aircraft and Floatable Module. The damping control unit controls the releasing speed of the wire.

A4. Audio-Video Module—it consists of audio device and video device which collects and records the real-time data of the outside environment.

A5. Positioning & Signaling Module detects and records the location information. It will communicate with the control tower sending the location information and emergency signal after it is ejected.

A6. Lighting Signal Module—it is set on the Floatable Module. The module includes an Active Lighting Unit and a Color Marker Unit which provides light signal during the rescue.

A7. Power Module—it is the power supply unit for the 'AWEIS' which is included in the Audio-Video Module, the Positioning & Signaling Module and the Lighting Signal Module.

Compared to the common rescue auxiliary equipment, the art of this invention is the film box unit in the Floatable Module which is pre-charged with high-pressure low-density gas. When emergency occurs, the Floatable Module will be released and start to inflate which can easily float in the air or above water. At the same time, the Audio-Video Module and the Positioning & Signaling Module start to collect data and send it to the control tower. The Lighting Signal Module will provide illumination for the rescue team even in the night.

If the voyage data transmitted to the "black box" is also transmitted to the Audio-Video Module at the same time, recorded and sent to the voyage control center, the 'AWEIS' system would be more functional than the "black box", shortening the search time, and decreasing the high search cost.

DETAILED DESCRIPTION OF THE INVENTION

One or more specific embodiments of the present invention will be described below. These described embodiments are only exemplary of the present invention. Additionally, in an effort to provide a concise description of these exemplary embodiments, all features of an actual implementation may not be described in the specification.

Figure 1:
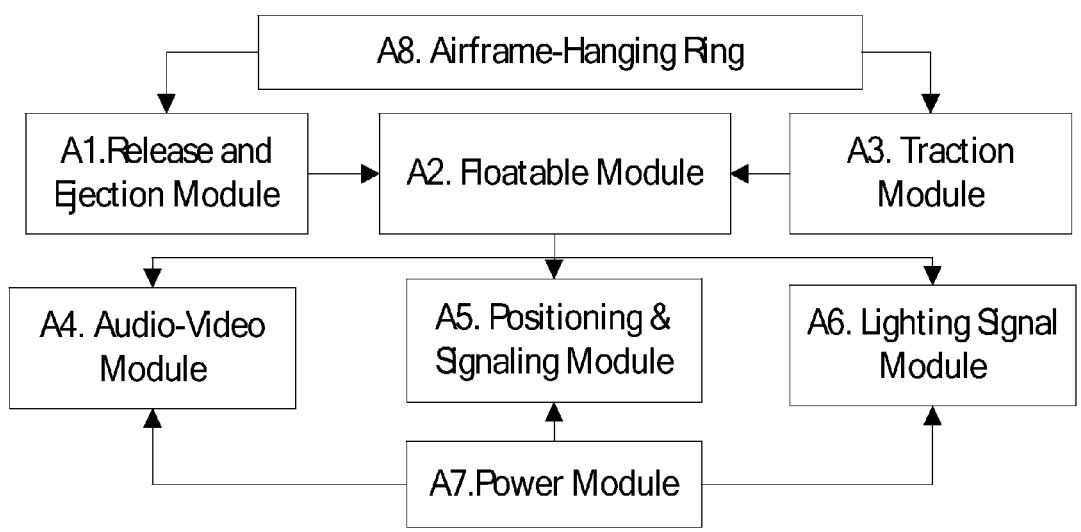
FIG. 1 is the figure of the system composition.

As shown in FIG. 1, this invention relates to an Aircraft and Watercraft Emergency Information System (AWEIS), which can be easily applied to aircraft, airship, spacecraft, ships, submarines, and other different kinds of watercraft. It includes:

A1. Release and Ejection Module is installed between airframe and Floatable Module. It can be controlled manually, electronically or automatically. When the power system in the aircraft is normal, the Release and Ejection Module can be operated by the electronic switch. In order to increase the reliability, there is also a manual wrench to operate the module. Both ways will be triggered simultaneously to make sure the Floatable Module can be released when needed.

A2. Floatable Module is the container for Audio-Video Module and Positioning & Signaling Module. It can be ejected in emergency. After the Floatable Module is ejected, the Audio-Video Module and Positioning & Signaling Module will start to work collecting, recording and sending data to control tower in order to help the rescue team.

A3. Traction Module connects the aircraft and Floatable Module. It keeps a certain distance between aircraft and Floatable Module. Under its control, the Audio-Video Module can get comprehensive data of the environment outside the aircraft.

A4. Audio-Video Module collects and records the real-time data of the external environment.

A5. Positioning & Signaling Module detects and records the location information. It contacts the control tower sending emergency signal when needed.

A6. Lighting Signal Module is set on the Floatable Module. It includes an Active Lighting Unit and a Color Marker Unit which provides light signal for rescue.

A7. Power Module is power supply units for whole the system.

Figure 2:
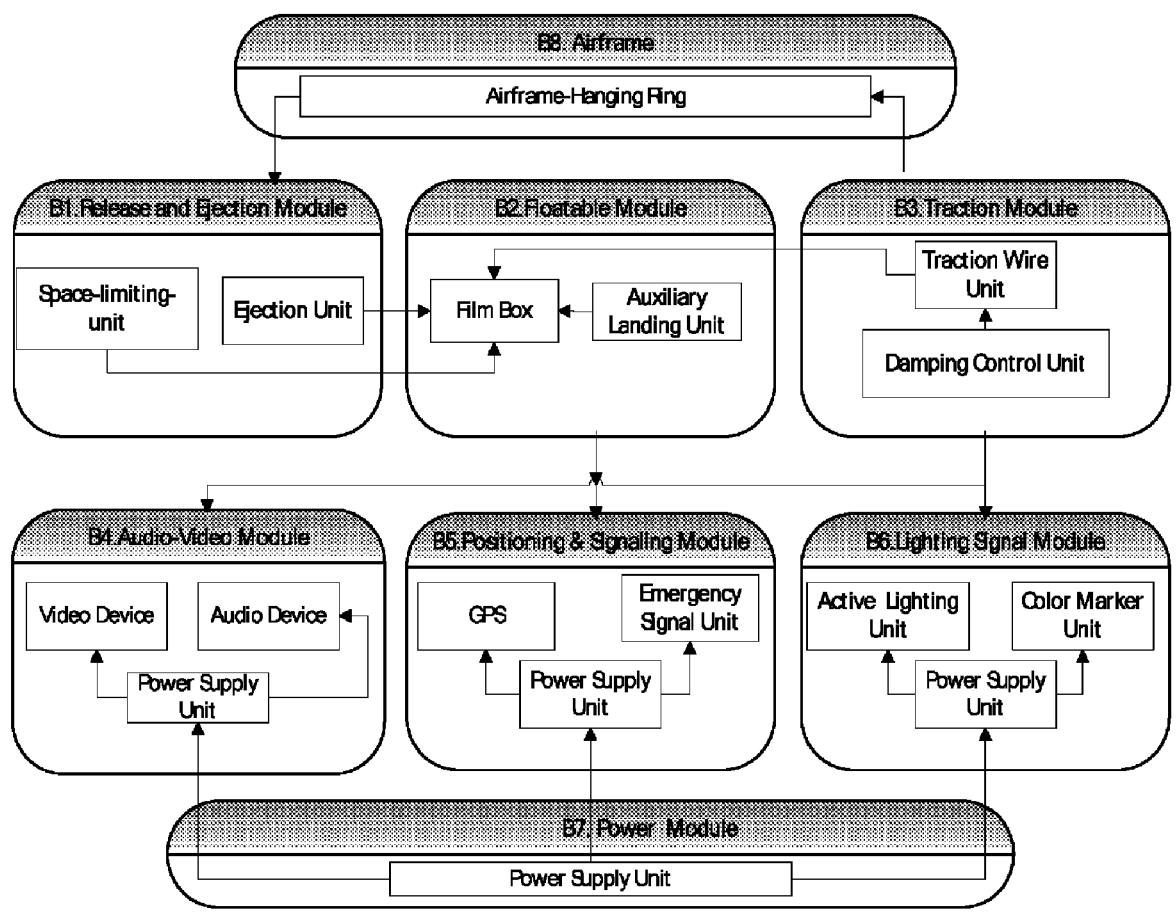
FIG. 2 lists the details and implementation of the system.

FIG. 2 illustrates the detail and implementation of each module.

The Release and Ejection Module includes the space-limiting-unit and ejection-unit. The space-limiting-unit limits the size of Floatable Module before launched. The ejection-unit releases the Floatable Module and ejects it outside the aircraft when in emergency.

The Floatable Module includes parachute and sealed film box unit which is pre-charged with high-pressure low-density gas. The sealed film box unit can float in the air or above water with the help of the expansion of the gas.

Audio-Video Module includes audio device and video device which collects and records the real-time data of the external environment.

Traction Module includes a traction wire unit and a damping control unit. The wire connects the Floatable Module and airframe with its two end connected to the Floatable Module and its middle went through the airframe hanging-ring. The ring should have sufficient strength and the size of the hanging-ring should large enough. With this design, we can substitute one end of the original wire with larger ones and drawing back the other end until we have a strong enough wire in order to lift the aircraft after it sunk.

Power Module is installed in Audio-Video Module, Positioning & Signaling Module and Lighting Signal Module respectively.

When the film box is ejected in emergency, it can float in the air with the help of the pre-charged low-density gas and the parachute and it can also float above water. At the same time, the Audio-Video Module will record all the surrounding environmental data. The Positioning & Signaling Module will start sending data and emergency signal to the control tower.

After we installed the 'AWEIS', not only it can keep a copy of internal data from the black box it can also store external environment data and send emergency signal in the emergency.

The following content will discuss the allocation of the 'AWEIS' with aircraft as the example.

1. We can install several sets of 'AWEIS' depending on the size of the aircraft. In a small plane, one can be installed on the cockpit. In a large aircraft, we can install four, one on cockpit, one on tail, and two on the wings respectively.

2. The wire in the Traction Module connects the Floatable Module and airframe with its two end connected to the Floatable Module and its middle went through the airframe hanging-ring. The ring should have sufficient strength and the size of the hanging-ring should large enough. After substituting the wire, we can lift the aircraft for rescue.

3. The controllers of the Release and Ejection Module, electronic switch and manual wrench, should be installed near the pilots. When the power system of the aircraft is normal, the Release and Ejection Module can be operated by the electronic switch. Otherwise the pilots should use the manual wrench. In order to increase the reliability, both ways will be triggered simultaneously to make sure the Floatable Module will be released when needed.

4. After we installed 'AWEIS' on the aircraft, we can charge the film box unit with high-pressure low-density gas (hydrogen or helium). The pressure within is indicated by the pressure gauge near the pneumatic valve.

If in emergency, the pilots can use the electronic switch or manual wrench to release the Floatable Module. If the aircraft explodes suddenly, the Floatable Module will be released because of the stress of the traction wire unit. After the Floatable Module was ejected outside the aircraft, the Floatable Module will start to inflate. With the help of the airflow and parachute, the Floatable Module will leave the aircraft farther and farther. At the same time, all the devices will start to work recording all the surrounding data, sending emergency signal. With the help of the lighting signal, it is easy for the rescue team to find the 'AWEIS' even in the dark.

If the aircraft sunk, we can substitute the wire connected to the film box with larger ones to lift the aircraft.

If the 'black-box' is linked to the 'AWEIS', we can find the 'black-box' by searching the AWEIS.

If the voyage data transmitted to the "black box" is also transmitted to the Audio-Video Module at the same time, recorded and sent to the voyage control center, the 'AWEIS' system would be more functional than the "black box", shortening the search time, and decreasing the high search cost.

In addition, considering the design and application:

1. All the system and attachments shall be designed and produced in order to meet the international standard.

2. Winch for wire substituting. After substituting the wire connected to the film box, we can lift the aircraft for rescue.

In summary, the art of the invention is the film-box unit which is pre-charged with high-pressure low-density gas. It will be ejected when in emergency. After it left the airframe, it starts to inflate keeping a distant with the aircraft. At the same time, Audio-Video Module will collect and record the external data. Positioning & Signaling Module will contact the control center sending emergency signal. Light Signal Module will begin to work providing sufficient illumination. With the help of the 'AWEIS', the rescue team can shorten searching time and start the rescue as soon as possible.

While the invention may be susceptible to various alternative forms and modifications, specific embodiments have been shown by way of example in the drawings and will be described in detail herein. However, it should be understand that the invention is not intended to be limited to the particular forms disclosed. Rather, the invention is to cover all equivalents, modifications, and alternatives falling within the spirit and scope of the invention as defined by the following claims.

We claim:

1. A method, comprising: an Aircraft and Watercraft Emergency Information System (AWEIS) which contains:
Audio-Video Module collects and records a real-time data of an external environment;
Positioning & Signaling Module detects and records the location information; the Positioning & Signaling Module contacts a control tower when needed;
Floatable Module is a container for Audio-Video Module and Positioning & Signaling Module; the Floatable Module can be ejected when in emergency; after the Floatable Module was ejected, the Audio-Video Module and Positioning & Signaling Module will start to work collecting, recording and sending data to the control tower in order to help a rescue team;
Lighting Signal Module is set on the Floatable Module; the Lighting Signal Module includes an Active Lighting Unit and a Color Marker Unit which provides light signal for rescue;
Release and Ejection Module is installed between airframe and Floatable Module which can be controlled manually, electronically or automatically; the Release and Ejection Module launches the Floatable Module when necessary;

Traction Module connects the aircraft and the Floatable Module; when the Floatable Module is ejected, the Traction Module keeps the aircraft and Floatable Module connected at a certain distant to ensure the collection of environment data; and Power Module is power supply unit for the system.

2. The method of claim 1, wherein the film box unit in the Floatable Module which is pre-charged with high-pressure low-density gas can float in the air or above water after inflation.

3. The method of claim 1, wherein the Traction Module includes a traction wire unit and a damping control unit; the traction wire unit connects the aircraft and Floatable Module; the damping control unit controls the releasing speed of the wire.

4. The method of claim 1, wherein the Power Module is the power supply unit for the 'AWEIS' which is included in the Audio-Video Module, the Positioning & Signaling Module and the Lighting Signal Module.

5. The method of claim 1, wherein the Release and Ejection Module includes the space-limiting-unit and ejection-unit; the space-limiting-unit limits the size of Floatable Module before the Floatable Module was launched; the ejection-unit releases the Floatable Module and ejects it outside the aircraft.

* * * * *